United States Patent

Kolbeck et al.

[11] 3,951,468
[45] Apr. 20, 1976

[54] AIR BRAKE SYSTEM FOR RAILWAY VEHICLES

[75] Inventors: Engelbert Kolbeck, Mering; Erich Sammer, Munich, both of Germany

[73] Assignee: Knorr-Bremse GmbH, Munich, Germany

[22] Filed: June 9, 1975

[21] Appl. No.: 584,965

[30] Foreign Application Priority Data
June 8, 1974 Germany............................ 2427778

[52] U.S. Cl................................ 303/81; 188/153 R; 303/86
[51] Int. Cl.²..................... B60T 11/28; B60T 15/04
[58] Field of Search .................... 303/68, 69, 81, 82, 303/84, 86, 18; 188/152, 151 R, 153 R

[56] References Cited
UNITED STATES PATENTS

| | | | |
|---|---|---|---|
| 2,779,635 | 1/1957 | Wideman | 303/68 |
| 3,220,781 | 11/1965 | Wooler | 303/68 |
| 3,275,383 | 9/1966 | Baechtel | 303/18 |
| 3,497,270 | 2/1970 | Sauthoff et al. | 303/68 X |
| 3,840,281 | 10/1974 | Huber et al. | 303/68 |

FOREIGN PATENTS OR APPLICATIONS

1,282,052   11/1968   Germany ........................... 303/68

*Primary Examiner*—Trygve M. Blix
*Assistant Examiner*—Douglas C. Butler
*Attorney, Agent, or Firm*—Edmund M. Jaskiewicz

[57] ABSTRACT

An air brake system for a railway vehicle has a brake control valve connected to a main air line which is maintained at a certain pressure when the brakes are released. Connected to the brake control valve is an air reservoir and a brake cylinder which is connected through suitable linkage to operate a friction brake. A valve device is provided which is actuated in response to the operating state of the friction brake and pressure in the main air line and includes a venting valve connected to the main air line so that the venting valve is opened during a simultaneous occurrence of the brake being in the braking state and the regular pressure level is maintained in the air line. Under other conditions the venting valve is closed.

9 Claims, 4 Drawing Figures

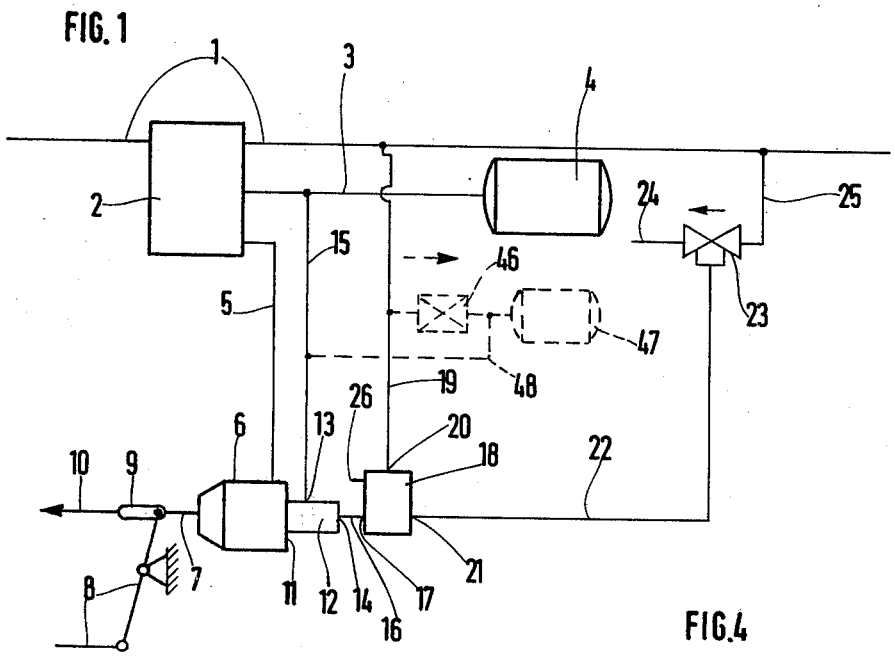
FIG. 1
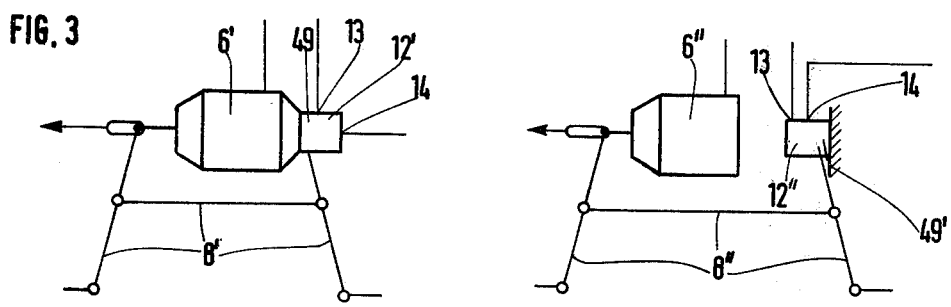
FIG. 3
FIG. 4
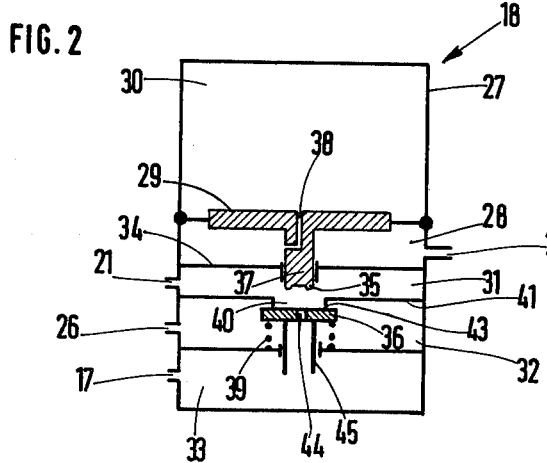
FIG. 2

AIR BRAKE SYSTEM FOR RAILWAY VEHICLES

The present invention relates to a compressed air braking system for a railway vehicle, more particularly, to such a system which will prevent movement of a train if the friction brake of a car in the train should be in the braking position because of an actuated hand brake or a defect in the system.

A known form of a compressed air brake system for railway vehicles comprises a main air line that is charged to a regular predetermined level of pressure when the brakes are released. A brake control valve is controlled by the air line and is connected to a brake cylinder that actuates a friction brake. The brake cylinder can be subjected to the action of pressure from a brake air reservoir through the brake control valve or can be evacuated to the atmosphere through the brake control valve.

In railway vehicles equipped with such an air brake system it has ocurred that because of a defect in the brake control valve the friction brake moves to the braking position and remains in this position even after the main air line is brought up to its regular level of pressure. It may also occur that the friction brake is actuated into the braking position and maintained in the braking position through the hand brake even after the main air line is charged to its regular pressure. It is possible to determine by means of a so-called major or great brake test whether any car of a train has a friction brake which, for some reason, remains in the braking position. This test essentially comprises inspecting the brakes of each vehicle under differential braking conditions. Because such a brake test requires a considerable expenditure of personnel and time, the test is carried out relatively rarely, such as just before a newly formed train of cars begins its trip. There is therefore a relatively high risk of a moving train having individual cars with applied brakes either because of a defect or actuation of a hand brake. Such braked cars may very easily cause damage to the particular cars and serious train accidents may occur because of the wheel rims which may become detached from the wheels. Such accidents may also be accompanied by fires particularly if the railway car in question is loaded with readily combustible or explosive goods.

It is therefore the principal object of the present invention to provide a novel and improved air brake system for railway vehicles of the type described above.

It is another object of the present invention to provide such an air brake system for railway vehicles which eliminates the danger of moving a train of cars when one of the cars has its brakes in the applied position.

It is a further object of the present invention to provide such an air brake system for railway vehicles wherein a train of cars cannot be moved in the event that one of the cars has its friction brakes applied because of an actuated hand brake or a defect.

According to one aspect of the present invention an air brake system for a railway vehicle may comprise a brake control valve connected to a main air line which contains a regular predetermined pressure when the brakes are in the released position. An air reservoir is connected to the brake control valve to which is also connected a brake cylinder. The brake cylinder may be subjected to an air pressure from the reservoir and may be evacuated to the atmosphere so as to operate a friction brake which is connected to the cylinder. Valve means including a venting valve connected to the air line is connected to the brake cylinder and air line for venting the air line to the atmosphere in response to the friction brake of a vehicle being in the braking state concurrently with the predetermined pressure existing in the main air line. When these conditions do not occur, the venting valve will be closed.

Other objects and advantages of the present invention will be apparent upon reference to the accompanying description when taken in conjunction with the following drawings, which are exemplary, wherein;

FIG. 1 is a diagrammatic view of a compressed air brake system for a railway vehicle according to the present invention;

FIG. 2 is a schematic sectional view through a pressure monitor valve employed in the air brake system of FIG. 1; and FIGS. 3 and 4 show schematically modifications of the mounting of a switching valve employed in the system of FIG. 1.

Proceeding next to the drawings wherein like reference symbols indicate the same parts throughout the various views a specific embodiment and modifications of the present invention will be described in detail.

In FIG. 1, a main air line 1 in a railway vehicle having the system of the present invention has connected therein a brake control valve 2. In a manner as known in the art, the control valve 2 is connected through a pipe 3 to a brake air reservoir 4 and through a pipe 5 to a brake cylinder 6. The brake cylinder 6 has a piston rod 7 extending therefrom which is pivotally connected to a brake linkage 8 which in turn is operatively connected to a friction brake which is not shown in the drawings. A rod 10 is actuated by a hand brake which is not shown in the drawings and is connected to the brake linkage 8 by a slot coupling 9.

The brake cylinder 6 has an end wall 11 upon which is flanged a switching valve 12 which may be of the construction as shown in German Pat. No. 1,282,052. According to this construction, the switching valve 12 has a stem or indicator rod which is not shown in the drawing but passes through a suitable opening in piston end wall 11 and senses the position of the piston, which is also not shown in the drawings, in the brake cylinder 6. Should the brake cylinder piston be in a position corresponding to the release state of the friction brake, the stem actuates switching valve 12 into a control position that blocks its two connections 13 and 14 from each other and connects the connection 14 to the atmosphere. In every other position of the brake cylinder piston, switching valve 12 will block the vent of connection 14 to the atmosphere and will connect connection 14 to the connection 13.

Connection 13 has extending therefrom a pipe 15 which leads to the brake air reservoir 4 and connection 14 leads through a pipe 16 to a connection 17 of a pressure monitor valve 18. A control pipe 19 leads from the main air line 1 to a control inlet connection 20 of the pressure monitor valve 18. Monitor valve 18 is also provided with a connection 21 which leads through a pipe 22 to the control inlet of a compressed air operated shut-off valve 23 that is connected in a pipe 25 leading from main air line 1 to an outlet 24 to the atmosphere. The shut-off valve 23 connects the atmospheric vent 24 to pipe 25 and air line 1 only when compressed air is supplied through line 22 into the shut-off valve 23. Otherwise, the shut-off valve 23 blocks this connection to the atmosphere connection 24.

The pressure monitor valve 18 is also provided with a vent 26 to the atmosphere. The valve 18 will connect its connections 17 and 21 to each other and will block connection 21 from atmosphere vent 26 as long as the regular level of pressure prevails in the main air line 1 and which pressure also is introduced at the control inlet 20. When the pressure in the main air line 1 drops below its regular level, pressure monitor valve 18 will block its two connections 17 and 21 from each other and will connect its connection 21 to the atmosphere vent 26.

The structure of the pressure monitoring valve 18 is illustrated schematically in FIG. 2 and enables the valve to automatically adjust to the specific regular level of pressure in the main line 1. The valve 18 comprises a housing 27 in which is formed a first control chamber 28 separated by a control piston 29 consisting of a diaphragm piston from a second control chamber 30. The control inlet 20 opens directly into the first control chamber 28.

Adjacent the first control chamber 28 is a chamber 31 of a fixed volume which communicates with connection 21. Adjacent to the chamber 31 is a chamber 32 to which is connected the atmosphere vent 26. Adjacent the chamber 32 is a chamber 33 to which is connected the connection 17.

The control piston 29 comprises an axially extending valve stem 37 which is slidably displaceable in sealed relationship in an opening formed in a partition 34 separating the chambers 28 and 31. The end of the valve stem 37 extends into the chamber 31 and is provided with a valve seat 35 which is engageable with a double valve plate 36. The valve stem 37 is provided with a nozzle or throttle passage 38 which extends through the piston 29 and has one end opening into the second control chamber 30 and the other end opening in the first control chamber 28 closely adjacent the partition 34 when the control piston 29 is in its normal position as shown in FIG. 2.

The double valve plate 36 is located in the chamber 32 and is pressed by a spring 39 against a valve seat 43 surrounding an opening 40 in a partition 41 between the chambers 31 and 32. The valve plate 36 has an opening 44 which can be closed by the valve seat 35 on valve stem 37. The valve plate 36 is also provided with a tubular extension 45 that surrounds the opening 44 and projects into the chamber 33. The tubular extension 45 is slidably displaceable in sealed relationship through an opening in the partition between the chambers 32 and 33.

When the air brake is in the released position and is ready for operation, the components will be in their respective positions as shown in FIGS. 1 and 2. In this state, air line 1, brake air reservoir 4, connection 13 of switching valve 12 and both control chambers 28 and 30 of pressure monitor valve 18 are subjected to the regular level of pressure to which the air line 1 has been charged. The brake control valve 2 keeps the brake cylinder 6 connected to the atmosphere so that when the hand brake is actuated to the release position, the brake linkage 8 will assume the position corresponding to a released friction brake. The piston of brake cylinder 6 causes the switching valve 12 to be maintained in its control position in which connection 13 is shut off and connection 14 is connected to the atmosphere. In the pressure monitor valve 18 the control chambers 28 and 30 are connected to each other through the nozzle 38, the double valve plate 36 engages the valve seat 43 and the chambers 31 and 33 communicate to each other through the opening 40 and the tubular extension 45. The pipe 22 is thus connected to the atmosphere through the pressure monitor valve 18, pipe 16 and switching valve 12. The shut-off valve 23 holds the atmosphere vent 24 closed.

When the pressure in the main air line 1 is lowered for a braking operation, the pressure also decreases in the first control chamber 28 of the pressure monitor valve 18 while the pressure in the second control chamber 30 is maintained because of the throttling effect of the nozzle 38. As a result, the control piston 29 is subjected to the greater pressure existing in second control chamber 30 and is displaced downwardly as viewed in FIG. 2. The downward movement of control piston 20 enables the lower opening of nozzle 38 to reach the wall of partition 34 where it is closed by the seal or packing for the valve stem 37. The second control chamber 30 is thus closed and the pressure prevailing therein remains. During the downward movement of valve stem 37, the valve seat 35 engages the valve plate 36 to close the opening 44 and move the valve plate 36 downwardly away from the valve seat 43. This action blocks the pipe 22 from pipe 16 and connects the pipe 22 to the atmosphere vent 26. The shut-off valve 23 will remain closed.

During this described braking operation, the brake control valve 2 will switch over to subject the brake cylinder 6 to the action of compressed air from brake air reservoir 4. Accordingly, the piston of brake cylinder 6 together with piston rod 7 and brake linkage 8 will be shifted into a position to apply the friction brake. The switching valve 12 will correspondingly change its position in response to the change of position of the brake cylinder piston to connect its connections 13 and 14 and shut off its vent to the atmosphere. The compressed air from brake cylinder 6 will thus flow to pipe 16 which, however, will not have any consequence because of the abovedescribed switching action of the pressure monitor valve 18. The continued braking sequence occurs in the conventional manner as known in the art for such air brake systems.

When the friction brake is released by the increase of pressure in main air line 1 to its regular level, the abovedescribed sequence is reversed in a corresponding manner until the components attain their initial positions as shown in FIGS. 1 and 2. The shut-off valve 23 will also remain closed.

If the hand brake should be pulled while the brake system is being actuated into the braking state as described above, the rod 10 together with its slot 9 will be displaced to the left as viewed in FIG. 1. During a subsequent release operation while the brake cylinder 6 is evacuated and the pressure in the air line 1 is raised to its regular level, the rod 10 by the coaction of slot 9 will hold the brake linkage 8, piston rod 7 and the piston of brake cylinder 6 in their braking positions. Accordingly, the switching valve 12 will remain in its control position corresponding to an applied friction brake wherein connections 13 and 14 are connected to each other while the pressure monitor valve 18 switches into its position shown in FIG. 2 as the regular level of pressure returns into the air line 1. Compressed air will thus flow from the brake air reservoir 4 through pipes 3 and 15, switching valve 12, pipe 16, chamber 33, tubular extension 45, opening 44, chamber 31 and pipe 22 to the control inlet of shut-off valve 23 which is now switched to its other condition. As a result, compressed air will flow from the air line 1 through pipe 25, shut-off valve 23 and outlet 24 to the atmosphere so that a rapid decrease of pressure in air line 1 will occur as a result of which each brake control valve 2 connected to the air line 1 and all of the brakes of the vehicles coupled into a train will be actuated into their braking positions. Thus, the train will be unable to move.

It is only after the hand brake is released so that rod 10 is shifted to the right and the brake cylinder piston is free to return to the release position and upon the raising of the pressure in air line 1 to its regular level will the switching valve 12 and pressure monitor valve 18 be able to return to their control position as described above in which the pipe 22 is blocked. Upon the supply of further pressure into airline 1 to raise the pressure level therein the brakes of all of the cars coupled in the train will be released to enable the train to move.

When the brakes are being released by increasing the pressure in the air line to the regular level, a similar sequence of steps will occur when the piston of the brake cylinder 6, for some reason, does not reach the position corresponding to the brake release position. Such a reason may be a defect in the brake control valve 2 such that the pipe 5 is continuously subjected to the action of compressed air through the valve 2 or because of jamming of the brake linkage 8 in the braking position. In all such cases, there will be a decrease of pressure in the air line 1 by opening of the shut-off valve 23. This decrease of pressure in the air line 1 will again apply the brakes on all of the cars of the train. The brakes can only be released after the defect has been remedied. As a result, this action prevents the starting up of a train containing a single car whose brakes are applied because of a previous actuation of the hand brake or because of a defect.

As can be seen in FIG. 1, the connection 13 of switching valve 12 is connected to the brake air reservoir 4 for the purpose of providing a source of compressed air. When the brake control valve 2 is shut off from the main air line 1 and the pneumatic brake control is thus switched off (the structure for this is known and accordingly is not shown in FIG. 1), brake air reservoir 4 is ordinarily evacuated and the compressed air supply for controlling the shut-off valve 23 thus fails. If the shut-off valve 23 is to be operational also under these conditions, there must be provided a compressed air reservoir 47 chargeable through a check valve 46 to be connected to the main air line 1 as indicated by the dash lines in FIG. 1. The reservoir 47 should be connected through a pipe 48 to connection 13 of switching valve 12 which is disconnected from brake reservoir 4. All of the brakes of the cars coupled into a train are then operated even in the switched-off state of brake control valve 2 should the brake of the vehicle having the switched-off brake control valve 2 be operated such as by the hand brake, and the brakes of the remaining vehicles would be released through the introduction of air into the main air line 1 to raise the pressure to the regular predetermined level.

As a modification of the structure of FIG. 1, the switching valve 12 may be actuated not only in response to the position of the piston in brake cylinder 6 but also in response to other conditions or criteria for the brake or release state of the vehicle friction brake. As shown in FIG. 3 a switching valve 12' may be located on the load of a point of support on the brake linkage 8' which may be a fulcrum 49 on a brake cylinder 6' for the H-linkage 8'. The structure of such a fulcrum as a switch or switching valve that can be switched by the actuated state of the brake is disclosed in the German Pat. No. 1,078,158 and thus need not be described in further detail.

As shown in FIG. 4, a support point 49' of a brake linkage 8'' provided with a switching valve 12' may be located separately from a brake cylinder 6''. In the modifications of FIGS. 3 and 4, switching valve 12' or 12'' with its connections 13 and 14 is arranged in the braking position as illustrated and disclosed in connection with the structure of FIG. 1. Further, the structure and function of the switching valves 12' and 12'' are similar to those of FIG. 1 and a description of their operation need not be repeated.

In order to reduce the costs of connection, installation and assembly, it may be expedient to include structurally the monitor valve 18 within brake control valve 2. Further, control chamber 30 with its nozzle 38 which monitors the filling of the control chamber may be omitted in the pressure monitor valve if its automatic adaptation to the regular level of pressure in the main air line is sacrificed and there is instead accepted a certain tolerance dependent sluggishness. The control piston 29 may be loaded against the pressure in control chamber 28 by a spring that is adjusted to the regular level of pressure in the main air line 1.

It will be understood that this invention is susceptible to modification in order to adapt it to different usages and conditions, and accordingly, it is desired to comprehend such modifications within this invention as may fall within the scope of appended claims.

What is claimed is:

1. An air brake system for a railway vehicle comprising a main air line containing a predetermined pressure when the brakes are in the release state, a brake control valve connected to said main air line, an air reservoir connected to said brake control valve, a brake cylinder connected to said brake control valve to be subjected to air pressure from said reservoir and to be evacuated to the atmosphere so as to operate a friction brake connected thereto, and valve means connected to said brake cylinder and main air line and including a venting valve connected to said air line for venting said air line to the atmosphere in response to the friction brake being in the braking state concurrently with said predetermined pressure existing in said main air line.

2. An air brake system as claimed in claim 1 wherein said venting valve comprises an air actuated shut-off valve having a control inlet, a pressure monitor valve connected to said control inlet and a source of air under pressure and connected to said air line, a switching valve in series with said pressure monitor valve and actuated by said friction brake, said pressure monitor valve and said switching valve having a first control position in which said connection to said shut-off valve control inlet is open and a second control position in which said connection to said shut-off valve is closed.

3. An air brake system as claimed in claim 2 wherein said source of air under pressure comprises a reservoir connected to said main air line and a check valve in said reservoir connection.

4. An air brake system as claimed in claim 2 wherein said source of air under pressure comprises a brake air reservoir.

5. An air brake system as claimed in claim 2 wherein said pressure monitor valve includes means for adjusting automatically to the pressure in said main air line.

6. An air brake system as claimed in claim 5 wherein said pressure monitor valve comprises a control piston defining a first control chamber on one side thereof and a second control chamber on the other side thereof, said control piston having a nozzle therein communicating between said first and second control chambers, a first valve between said shut-off valve and said switching valve operable by said control piston between open and closed positions, a second valve between said shut-off valve and the atmosphere operable by said control piston between open and closed positions, and means operable by said control piston for closing the communication between said first and second control chambers, said closing means being closed, said first valve being closed and said second valve being open when said control piston is subjected to a greater pressure in said second control chamber and said first and second valves and said closing means being in their opposite positions in other pressure relationships.

7. An air brake system as claimed in claim 6 wherein said pressure monitor valve further comprises a third chamber adjacent said first control chamber and connected to said shut-off valve control inlet, a fourth chamber continuously connected to the atmosphere, a fifth chamber connected to said air source, a first partition separating said first and third chambers, a valve stem extending from said control piston and slidably displaceable through said first partition, said nozzle being within said valve stem such that one end of said nozzle opens in said second control chamber and the other end of said nozzle opens into said first control chamber or is closed in response to the position of said control piston, one end of said valve stem being in said third chamber and having a valve seat thereon, a double valve plate normally closing a passage in a second partition between said third and fourth chambers and a spring urging said valve plate into the closed position, there being a second opening in said valve plate adapted to be closed by said valve stem and valve seat, and a tubular extension surrounding said second opening and extending from said valve plate through a third partition between said fourth and fifth chambers into said fifth chamber.

8. An air brake system as claimed in claim 2 wherein said switching valve comprises a sensor responsive to the position of the piston of said brake cylinder.

9. An air brake system as claimed in claim 2 wherein said switching valve is responsive to the bearing load on a fulcrum of the brake linkage.

* * * * *